(12) United States Patent
Lin et al.

(10) Patent No.: US 8,472,973 B2
(45) Date of Patent: Jun. 25, 2013

(54) ADAPTIVE ENERGY-EFFICIENT LOCATION DETERMINATION

(75) Inventors: Jyh-Han Lin, Mercer Island, WA (US); Gang Zhao, Redmond, WA (US); Timothy David Sharpe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/766,208

(22) Filed: Apr. 23, 2010

(65) Prior Publication Data
US 2011/0264940 A1 Oct. 27, 2011

(51) Int. Cl.
*H04W 24/00* (2009.01)
(52) U.S. Cl.
USPC ............ 455/456.1; 455/404.2; 455/574; 455/512; 455/513
(58) Field of Classification Search
USPC ............ 455/456.1–456.6, 404.2, 574, 512, 455/513
See application file for complete search history.

(56) References Cited

U.S. PATENT DOCUMENTS

| | | | |
|---|---|---|---|
| 6,847,892 B2 | 1/2005 | Zhou et al. | |
| 6,963,744 B2 | 11/2005 | Lin | |
| 7,286,833 B2 * | 10/2007 | Friday et al. | 455/456.1 |
| 7,359,713 B1 | 4/2008 | Tiwari | |
| 2009/0054096 A1 * | 2/2009 | Single | 455/509 |
| 2012/0021768 A1 * | 1/2012 | Rudland et al. | 455/456.1 |

OTHER PUBLICATIONS

Aslam, et al., "Effective Location Management of Mobile Actors in Wireless Sensor and Actor Networks", Retrieved at << http://www.academypublisher.com/ojs/index.php/jnw/article/viewFile/04010108/763 >>, Journal of Networks, vol. 4, No. 1, Feb. 2009, pp. 1-8.
Liu, et al., "Survey of Wireless Indoor Positioning Techniques and Systems", Retrieved at << http://www.sis.pitt.edu/~dtipper/2011/Survey1.pdf >>, IEEE Transactions on Systems, Man, and Cybernetics, Part C: Applications and Reviews, Nov. 2007, pp. 1067-1080.
Fretzagias, et al., "Cooperative Location-Sensing for Wireless Networks", Retrieved at << http://ieeexplore.ieee.org/stamp/stamp.jsp?arnumber=01276851 >>, PERCOM, Proceedings of the Second IEEE International Conference on Pervasive Computing and Communications (PerCom'04), Mar. 14-17, 2004, pp. 11.
Constandache, et al., "Energy-Aware Localization Using Mobile Phones", Retrieved at << http://people.ee.duke.edu/~romit/pubs/romit-mb-poster.pdf >>, Mobisys Poster, 2008, p. 1.

\* cited by examiner

*Primary Examiner* — Wayne Cai (57) ABSTRACT

Managing use of a location sensor on a computing device for energy efficiency. The location sensor is briefly initialized to measure the signal quality. The measured signal quality is compared to pre-defined signal criteria values. The signal criteria values correspond to acceptable energy consumption, for example. If the signal criteria values are satisfied, location information for the computing device is obtained. Otherwise, the location sensor is disabled without obtaining the location information. In some embodiments, a lower-energy location sensor is used to obtain location information to determine whether to enable a higher-energy location sensor based on expected energy consumption.

14 Claims, 5 Drawing Sheets

ADAPTIVE ENERGY-EFFICIENT LOCATION DETERMINATION

BACKGROUND

Many mobile devices such as cellular telephones are equipped with location sensors such as global positioning system (GPS) receivers and/or other location sensing technology. While providing a valuable function, continual use of the location sensors by various positioning services executing on the mobile devices keeps the location sensors energized. The cost of continually energizing the location sensors is often expensive in terms of energy consumption. The already-limited battery life of the mobile devices is further shortened. Existing systems fail to manage usage of the location sensors to optimize energy consumption of the location operations.

SUMMARY

Embodiments of the disclosure enable energy-efficient location determination on a computing device. A location sensor associated with the computing device is enabled. One or more signal quality values of the location sensor are measured. The measured signal quality values are compared to one or more corresponding predefined signal criteria values. If the measured signal quality values satisfy the predefined signal criteria values, location information is obtained via the location sensor. Otherwise, the location sensor is disabled without obtaining the location information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable computing devices to manage use of location sensors 204 for energy efficiency. In some embodiments, signal quality information is briefly collected after initiating a location sensing operation. The collected information is compared to thresholds to determine whether to proceed with the location sensing operations. Some embodiments contemplate building an energy consumption profile mapping energy consumption by a computing device to particular locations. The energy consumption profile is subsequently used by the computing device to determine whether a location sensing session at a particular location may be energy-inefficient. The energy consumption profiles of the computing devices may be stored and/or shared via a community-based cloud service 418.

Referring again to FIG. 1, an exemplary block diagram illustrates a mobile computing device 102 detecting one or more nearby beacons. The mobile computing device 102 (e.g., a mobile telephone) detects or observes one or more beacons including cellular towers (or sectors if directional antennas are employed), wireless fidelity (Wi-Fi) access points, satellites, or other wireless access points (WAPs) via one or more location sensors 204 of the mobile computing device 102.

Figure 1:
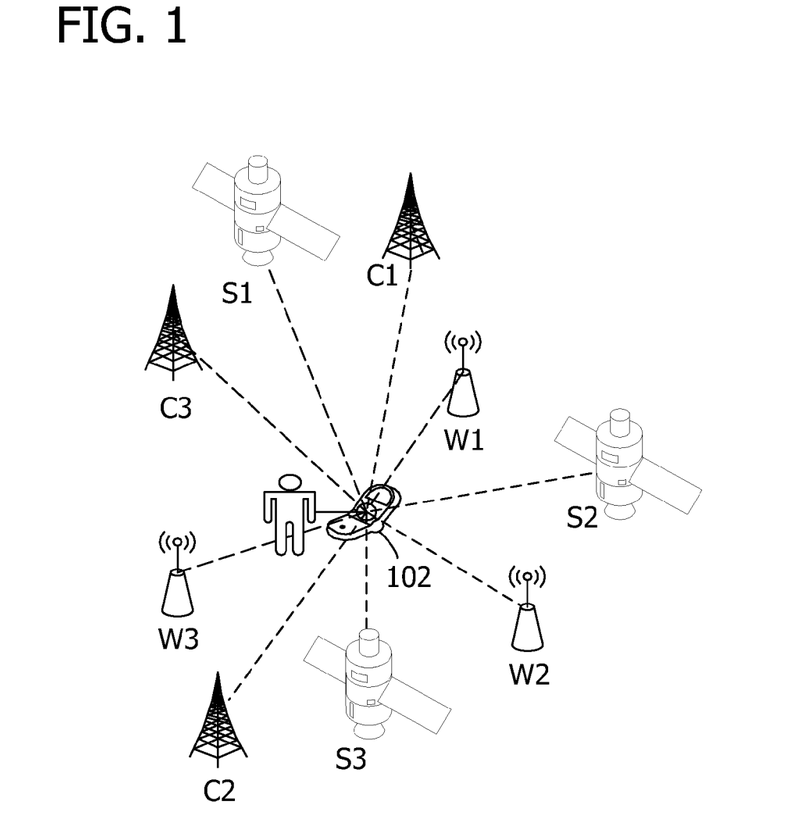
FIG. 1 is an exemplary block diagram illustrating a mobile computing device detecting one or more nearby beacons.

The beacons detected by the mobile computing device 102 at a given point in time represent a beacon fingerprint. The beacon fingerprint may also include other attributes of the detection or connection with the beacons such as signal quality, as discussed in detail below. While aspects of the disclosure may be described with reference to beacons implementing protocols such as the 802.11 family of protocols, embodiments of the disclosure are operable with any beacon for wireless communication. In the example of FIG. 1, the mobile device 102 detects the presence of beacons C1, C3, W1, W3, S1, S2, and S3.

A time-to-first-fix (TTFF) value represents the amount of time elapsed between enabling the location sensors 204 until location information is available. The TTFF value may vary based on a location of the mobile computing device 102.

Figure 2:
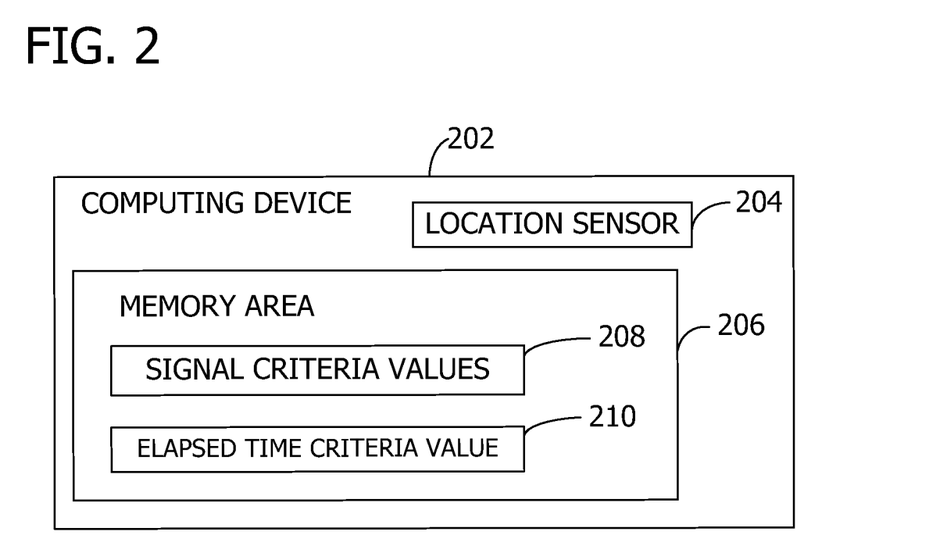
FIG. 2 is an exemplary block diagram illustrating a computing device having a location sensor and storing criteria values.

Referring next to FIG. 2, an exemplary block diagram illustrates a computing device 202 having a location sensor 204 and storing criteria values. The computing device 202 includes, for example, a mobile computing device such as mobile computing device 102 enabled with a global positioning system (GPS) receiver such as part of assisted GPS, a radio such as in a wireless fidelity (Wi-Fi) positioning system or a cellular-based positioning system or a BLUETOOTH brand communication system, a three-dimensional motion sensor, or other element as the location sensor 204.

However, the device may include any device executing instructions (e.g., application programs) to provide data including detected beacons. In some embodiments, the device includes a portable computing device such as a laptop, netbook, gaming device, and/or portable media player. Further, the device may represent a group of processing units or other computing devices.

The memory area 206 includes any quantity of media associated with or accessible to the computing device 202. The memory area 206 may be internal to the computing device 202 (as shown in FIG. 2), external to the computing device 202 (not shown), or both (not shown). The memory area 206 stores one or more signal criteria values 208 and an elapsed time criteria value 210. These values 208, 210 are used by the computing device 202 as thresholds against which characteristics of connections with nearby detected beacons are compared.

Figure 3:
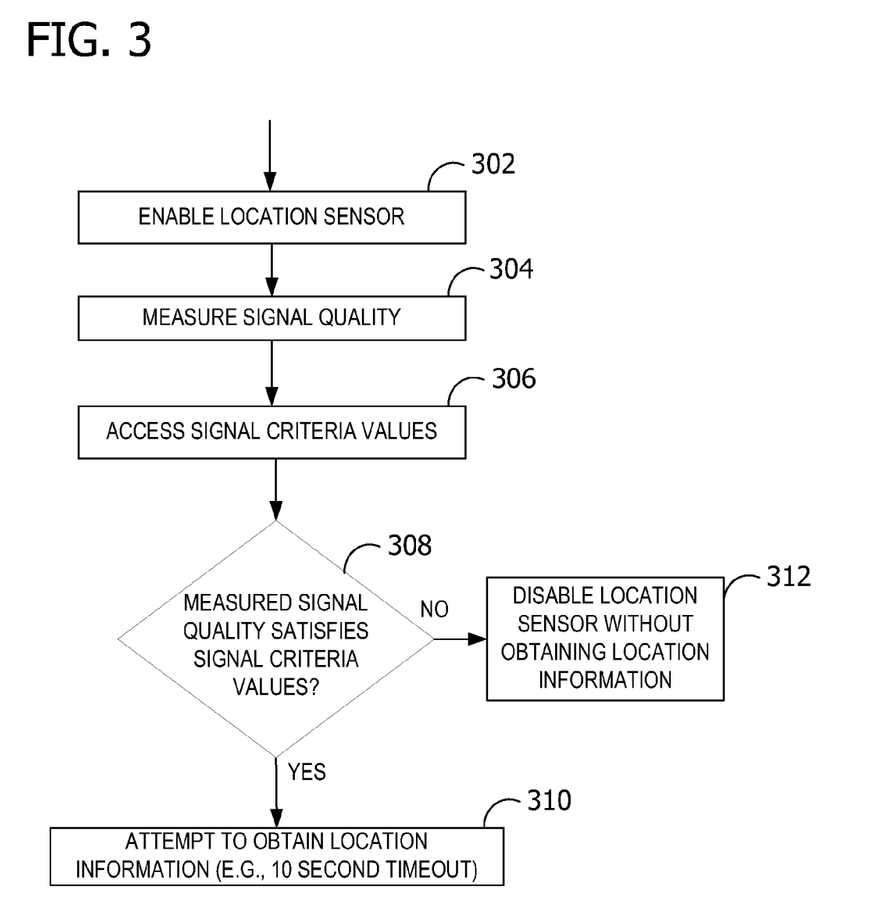
FIG. 3 is an exemplary flow chart illustrating operation of a computing device to selectively proceed with determining location information based on signal quality.

Referring next to FIG. 3, an exemplary flow chart illustrates operation of the computing device 202 to selectively proceed with determining location information based on signal quality. Via the operations illustrated in FIG. 3, the computing device 202 is able to briefly initiate a location sensing session to collect signal quality information to determine whether to proceed or abort the session. For example, GPS satellite signals are often obstructed indoors. The cost of obtaining a GPS position indoors, if even possible, may be high in that the TTFF may take several minutes and have a high energy-per-fix cost. In such situations, aspects of the disclosure may not proceed to obtain the location information.

At 302, the location sensor 204 associated with the computing device 202 is enabled. For example, the location sensor 204 may be energized, powered, probed, or otherwise modified to make available the capabilities of the location sensor 204 for location determination. Exemplary location sensors 204 include, but are not limited to, a GPS receiver or a Wi-Fi adapter.

At 304, one or more signal quality values of the enabled location sensor 204 are measured. Exemplary signal quality values include, but are not limited to, a signal strength or a signal-to-noise ratio. In embodiments in which the location sensor 204 is a GPS receiver, exemplary signal quality values include a quantity of satellites observed by the GPS receiver. In other embodiments, measuring the signal quality values includes exchanging data with a wireless access point.

At 306, one or more of the signal criteria values 208 are accessed. The signal criteria values 208 represent thresholds, standards, costs, minimum acceptable criteria, or maximum acceptable criteria by which to judge the measured signal quality values. The signal criteria values 208 may be determined empirically or dynamically (e.g., based on an average or mean calculation), defined by a user of the computing device 202, or calculated or derived from other values (e.g., cost values). In some embodiments, prior to measuring the signal quality values at 304, the signal criteria values 208 are dynamically defined. For example, the signal criteria values 208 may be defined or adjusted based on previously measured signal quality values. This allows the operations in FIG. 3 to accommodate changing environments, contexts, or computing device 202 status or configuration. Some embodiments include different signal criteria values 208 based on location, time (e.g., time-of-day), computing device 202, or condition of the computing device 202. For example, the high-energy consumption associated with a poor signal quality may be unacceptable during daylight, but acceptable at nighttime when there may be a greater desire to obtain the location information.

For example, in embodiments in which the location sensor 204 is a GPS receiver, the signal criteria values 208 may include a minimum quantity of satellites observed by the GPS receiver. In other embodiments, the signal criteria values 208 specify a maximum acceptable signal-to-noise ratio (e.g., 20 dB) or a minimum signal strength. In still other embodiments, the signal criteria values 208 correspond to a financial cost (e.g., connection fees, etc.) or an energy cost (e.g., battery consumption) for obtaining the location information.

At 308, the measured signal quality values are compared to one or more of the accessed signal criteria values 208. If the measured signal quality values satisfy the signal criteria values 208 at 308, the location information for the computing device 202 is obtained at 310 via the location sensor 204. If the measured signal quality values fail to satisfy the accessed signal criteria values 208 at 308, the location sensor 204 is disabled at 312 without obtaining the location information.

Satisfying the signal criteria values 208 may include, for example, determining that each of the measured signal quality values satisfies the corresponding signal criteria values 208, determining that at least one of the measured signal quality values satisfies the corresponding signal criteria value 208, or determining that a particular combination (e.g., a weighted combination) of the measured signal quality values satisfies the corresponding signal criteria values 208. For example, the measured signal strength may be weighted more heavily than the measured signal-to-noise ratio such that the location information is obtained if the measured signal strength satisfies the corresponding signal criteria value 208 even though the measured signal-to-noise ratio fails to satisfy the corresponding signal criteria value 208.

Satisfying the signal criteria values 208 may include, for example, determining that the measured signal quality values are less than, are greater than, are equal to, or otherwise do not violate the signal criteria values 208. Conversely, failing to satisfy the signal criteria values 208 may include, for example, determining that the measured signal quality values are less than, are greater than, are equal to, or otherwise violate the signal criteria values 208.

In some embodiments, the amount of time spent measuring the signal quality values also affects whether the location information is obtained at 310. For example, an elapsed time value is measured or calculated while measuring the signal quality values. If the measurement of the elapsed time value exceeds the elapsed time criteria value 210 (e.g., 60 seconds), the location sensor 204 is disabled without obtaining the location information. The elapsed time criteria value 210 may also be referred to as a timeout value for measuring the signal quality values.

In some embodiments, the operations illustrated in FIG. 3 are performed by the computing device 202. In other embodiments, one or more of the operations illustrated in FIG. 3 are performed by another computing device (e.g., as a web service).

Figure 4:
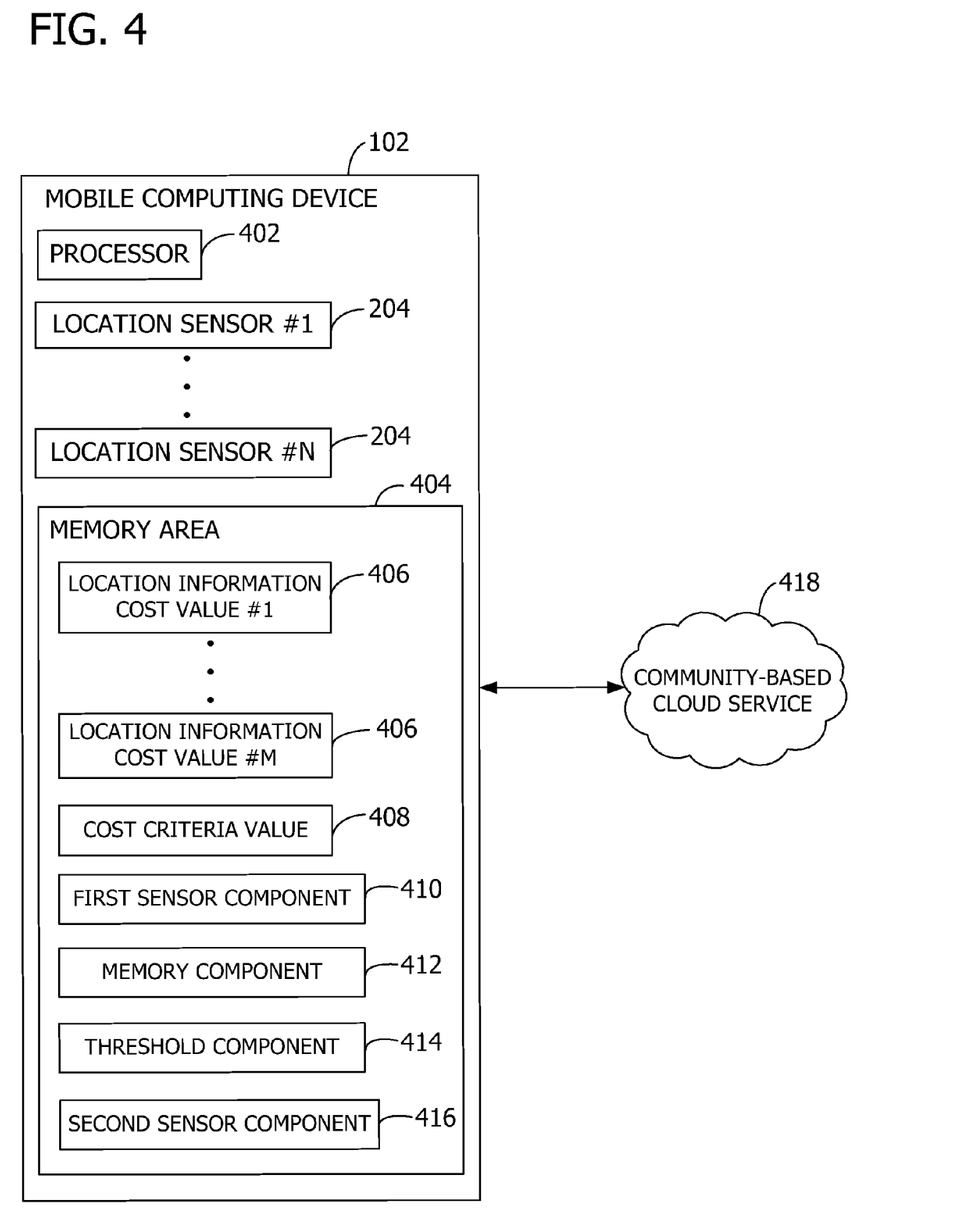
FIG. 4 is an exemplary block diagram illustrating a mobile computing device.

Referring next to FIG. 4, an exemplary block diagram illustrates the mobile computing device 102 communicating with the community-based cloud service 418. The elements illustrated in FIG. 4 operate to provide energy-efficient location determination on the mobile computing device 102.

The mobile computing device 102 has at least one processor 402, a plurality of location sensors 204, and one or more computer-readable media such as a memory area 404. The processor 402 includes any quantity of processing units, and is programmed to execute computer-executable instructions for implementing aspects of the disclosure. The instructions may be performed by the processor 402 or by multiple processors executing within the mobile computing device 102, or performed by a processor external to the mobile computing device 102. In some embodiments, the processor 402 is programmed to execute instructions such as those illustrated in the figures (e.g., FIG. 4 and FIG. 5).

The location sensors 204, such as location sensor #1 through location sensor #N, include any element for communicating with another device to obtain location information or data from which to derive the location information. For example, the location sensor 204 may include a GPS receiver, a Wi-Fi adapter, a BLUETOOTH brand communication service element, or the like.

The memory area 404 includes any quantity of media associated with or accessible to the mobile computing device 102. The memory area 404 may be internal to the mobile computing device 102 (as shown in FIG. 4), external to the mobile computing device 102 (not shown), or both (not shown).

The memory area 404 stores a plurality of location information cost values 406 such as location information cost value #1 through location information cost value #M. The location information cost values 406 are associated with a mobility pattern of the mobile computing device 102. The location information cost values 406 represent the costs of obtaining location information for the mobile computing device 102 while the mobile computing device 102 is in particular locations. The mobility pattern represents a pattern of movement of the mobile computing device 102 over a period of time (e.g., hours, days, weeks). The mobility pattern has a plurality of locations associated therewith. For example, the mobility pattern may indicate that the mobile computing device 102 moves between two locations (e.g., work and home) each day. The location information cost values 406 are computed and stored in the memory area 404 as the mobile computing device 102 moves around determining location information.

The memory area 404 further stores at least one cost criteria value 408. The cost criteria value 408 represents a threshold cost (e.g., maximum acceptable cost) of obtaining the location information for the mobile computing device 102. In some embodiments, the cost criteria value 408 includes a plurality of values each associated with a particular location. This enables the importance of obtaining the location information to be differentiated among particular locations. For example, obtaining the location information near a downtown area with high-rise buildings may have a high cost, but the user or mobile computing device 102 has deemed the value of obtaining the location information at this location to be high. The cost criteria value 408 for this location is then set accordingly (e.g., higher than other cost criteria values 408). In another example, obtaining the location information near the home of the user may have an average cost, but may provide less value to the user because the user is familiar with the neighborhood. The cost criteria value 408 for this location is then set lower than other cost criteria values 408.

The cost criteria value 408 may also include a plurality of values each associated with a particular time or range of times during the day. For example, a high cost for obtaining the location information may be acceptable at night when there is a stronger desire to obtain the location information. The cost criteria value 408 in this example is then set to a higher value relative to the other cost criteria values 408 to enable the mobile computing device 102 to obtain the location information. The cost criteria value 408 may also vary based on time of day, computing device, condition of the computing device, and/or other factors.

The memory area 404 further stores one or more computer-executable components for implementing aspects of the disclosure. The components execute to profile an environment of the mobile computing device 102 opportunistically during usage of the location sensors 204 to record an energy consumption profile. For example, every time the location sensor 204 is turned on in a particular location by the user, an application program, or other triggering event, the energy consumption profile (e.g., a TTFF value) is calculated and associated with the location (e.g., a beacon fingerprint). The energy consumption profile is represented in some embodiments as the location information cost values 406 (e.g., energy-per-fix values). The components further execute to avoid expensive location determination sessions based on the location information cost values 406 and instead opt to perform energy-efficient location determination sessions. In one example of FIG. 4, radio frequency fingerprints are acquired with low energy to identify the environments where efficient GPS fixes are probable.

In particular, exemplary components include a first sensor component 410, a memory component 412, a threshold component 414, and a second sensor component 416. The first sensor component 410, when executed by the processor 402, causes the processor 402 to enable (e.g., energize) one of the location sensors 204 (e.g., a first location sensor) and obtain location information (e.g., first location information) from the first location sensor during a session. For example, the first location sensor is a Wi-Fi adapter and the first location information is a beacon fingerprint (e.g., set of observed beacons). The memory component 412, when executed by the processor 402, causes the processor 402 to access the memory area 404 on the mobile computing device 102 to retrieve the location information cost value 406 associated with the first location information (e.g., a beacon fingerprint). The threshold component 414, when executed by the processor 402, causes the processor 402 to compare the retrieved location information cost value 406 to the cost criteria value 408 stored in the memory area 404.

If the retrieved location information cost value 406 satisfies the cost criteria value 408, the second sensor component 416, when executed by the processor 402, causes the processor 402 to enable another location sensor (e.g., a second location sensor) and to obtain additional location information (e.g., second location information) via the second location sensor. For example, the second location sensor is a GPS receiver and the second location information includes GPS coordinates. If the retrieved location information cost value 406 fails to satisfy the cost criteria value 408, the session closes without enabling the second location sensor.

The second sensor component 416 may further operate to calculate an updated location information cost value based on a calculated cost of the second location information. For example, the location information cost value 406 may be updated after a pre-configured quantity of location sensing operations (e.g., calculate an average location information cost value after ten sessions) or after each session.

The updated location information cost value is provided to the community-based cloud service 418 for storage and/or cached locally on the mobile computing device 102. The mobile computing device 102 is thus able to adapt its operation based on current location information cost values 406.

Some embodiments contemplate the first location sensor consuming less energy than the second location sensor. In such embodiments, the mobile computing device 102 is able to use the lower-energy location sensor to determine whether to even enable the higher-energy location sensor, thus reducing energy consumption on the mobile computing device 102.

Storing each of the location information cost values 406 in the limited cache on the mobile computing device 102 may consume the cache. As such, the plurality of location information cost values 406 calculated by or otherwise associated with the mobile computing device 102 are stored remotely from the mobile computing device 102. As the mobility pattern emerges, the mobile computing device 102 obtains the location information cost values 406 associated with the locations included in the mobility pattern. The mobile computing device 102 thus caches on the mobile computing device 102 the location information cost values 406 that are expected to be accessed frequently based on the mobility pattern. In the example of FIG. 4, the location information cost values 406 for the mobile computing device 102 are stored in the community-based cloud service 418.

In still further embodiments as described below with reference to FIG. 5, the location information cost values 406 obtained by the mobile computing device 102 may not be associated with or previously calculated by the mobile computing device 102. Rather, the location information cost values 406 stored by the community-based cloud service 418 are aggregated from a plurality of computing devices and then shared with the plurality of computing devices upon request. For example, the mobile computing device 102 may obtain the location information cost values 406 associated with an expected mobility pattern (e.g., a navigation route associated with an upcoming trip).

At least a portion of the functionality of the various elements in FIG. 4 may be performed by other elements in FIG.

4, or an entity (e.g., processor, web service, server, application program, computing device, etc.) not shown in FIG. 4.

Figure 5:
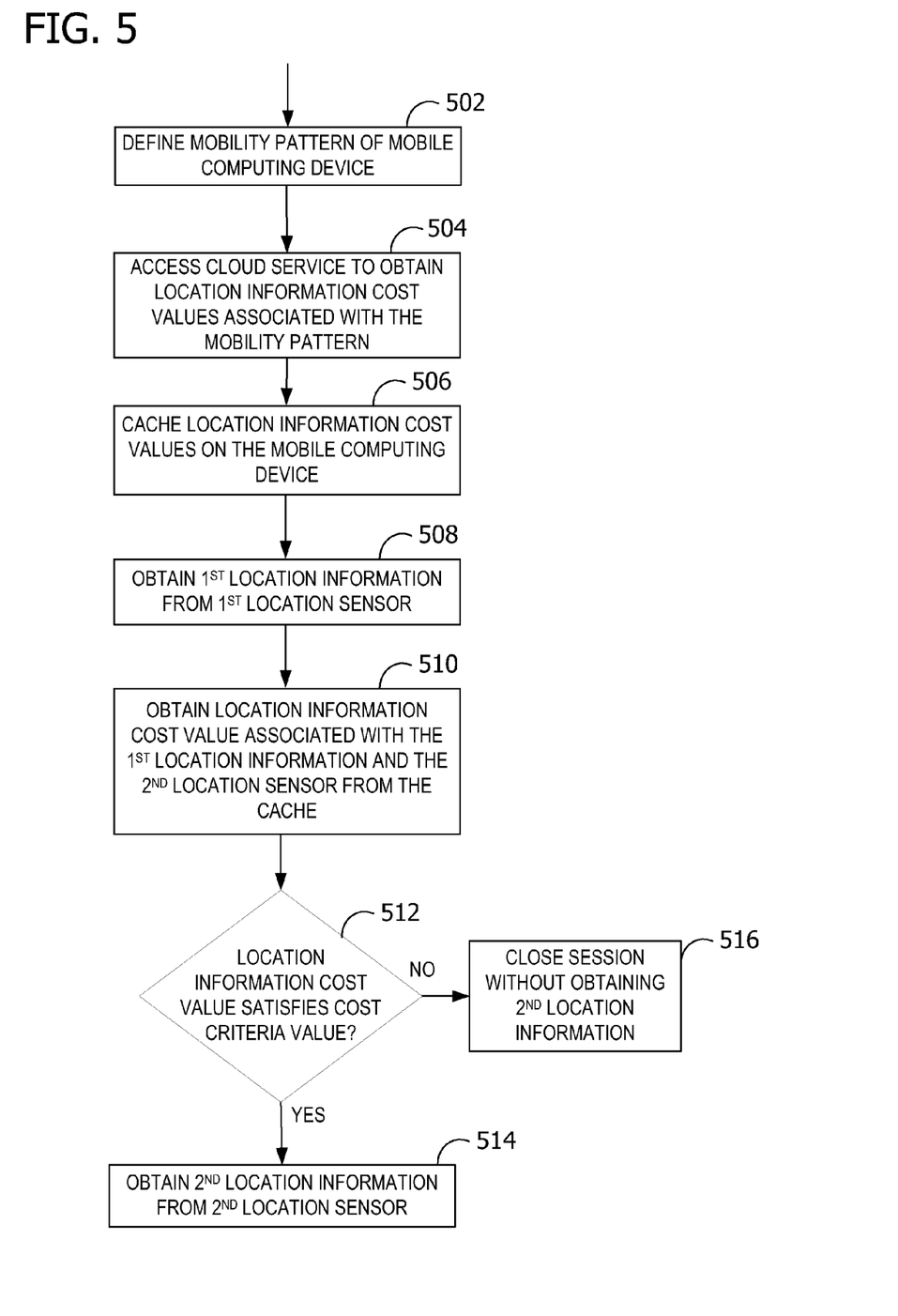
FIG. 5 is an exemplary flow chart illustrating operation of a computing device to selectively proceed with determining location information based on a cost of a previous location determination.

Referring next to FIG. 5, an exemplary flow chart illustrates operation of the mobile computing device 102 to selectively proceed with determining location information based on a cost of a previous location determination. In the example of FIG. 5, the location information cost values 406 are aggregated from a plurality of computing devices as a shared community resource. Mobile computing devices that enter particular locations thus benefit from the experiences of mobile computing devices that have entered the particular locations previously.

At 502, the mobility pattern of the mobile computing device 102 is defined. The community-based cloud service 418 is accessed at 504 to obtain the location information cost values 406 associated with the defined mobility pattern. For example, the location information cost values 406 stored by the community-based cloud service 418 are partitioned into tiles based on geographical location. The obtained location information cost values 406 represent a set of the location information cost values 406 personalized to the mobile computing device 102 based on the defined mobility pattern. At 506, the obtained location information cost values 406 are cached locally by the mobile computing device 102. First location information is obtained from the first location sensor at 508. The first location information is used at 510 to retrieve, from the local cache on the mobile computing device 102, the location information cost value 406 associated with a location described by the first location information. In some embodiments, there are separate location information cost values 406 for each second location sensor available to the mobile computing device 102. The retrieved location information cost value 406 is compared at 512 to the cost criteria value 408. If the location information cost value 406 satisfies the cost criteria value 408, the second location information is obtained from the second location sensor at 514. Otherwise, the session is closed at 516 without enabling the second location sensor and obtaining the second location information.

Alternatively or in addition to the location information cost value 406, other data may also be stored and retrieved. For example, the data may identify and prioritize or rank ways to configure and use the location sensor(s) at different locations. For example, when Wi-Fi scanning at home or near a neighborhood of the mobile computing device 102, a particular subset of the possible Wi-Fi channels may be identified for scanning.

In some embodiments, the operations illustrated in FIG. 5 are performed by the mobile computing device 102. In other embodiments, one or more of the operations illustrated in FIG. 5 are performed by another computing device (e.g., as a web service). Further, the operations illustrated in FIG. 5 may be implemented as software instructions encoded on a computer-readable medium, in hardware programmed or designed to perform the operations, or both.

Additional Examples

In some embodiments, the location information cost values 406 are represented as energy-per-fix values quantifying the amount of energy consumed to obtain location information. Exemplary energy-per-fix values range from 1500 mJ to obtain a low-level coarse location fix to 2500 mJ for a high-level precise fix.

While embodiments have been described with reference to data collected from users, aspects of the disclosure provide notice to the users of the collection of the data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for energy-efficient location determination on the mobile computing device 102 using two location sensors 204, and exemplary means for energy-efficient location determination on the mobile computing device 102 by using community-based location information cost values 406.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for energy-efficient location determination on a mobile computing device, said system comprising:
   a memory area for storing a plurality of location information cost values associated with a mobility pattern of the mobile computing device; and
   a processor programmed to:
      obtain first location information from a first location sensor associated with the mobile computing device during a session;
      access the memory area to retrieve the location information cost value associated with the obtained first location information;
      compare the retrieved location information cost value with a predefined cost criteria value;
      obtain second location information from a second location sensor associated with the mobile computing device if the retrieved location information cost value satisfies the predefined cost criteria value; and
      otherwise close the session without enabling the second location sensor.

2. The system of claim 1, wherein the processor is further programmed to:
   define the mobility pattern of the mobile computing device;
   obtain the location information cost values based on the defined mobility pattern from a community-based cloud service; and
   store the obtained location information cost values in the memory area.

3. The system of claim 1, wherein the first location sensor comprises a radio and the second location sensor comprises a global positioning system receiver.

4. The system of claim 1, wherein if the retrieved location information cost value satisfies the predefined cost criteria value, the processor is programmed to obtain the second location information by:
   enabling the second location sensor;
   measuring one or more signal quality values of the enabled second location sensor;
   comparing the measured signal quality values with one or more corresponding predefined signal criteria values;
   obtaining the second location information via the second location sensor if the measured signal quality values satisfy the predefined signal criteria values; and
   otherwise disabling the second location sensor without obtaining the second location information.

5. The system of claim 4, wherein the processor is further programmed to determine an elapsed time value associated with measurement of the signal quality values, and wherein the processor is programmed to obtain the second location information if the determined elapsed time value is less than a predefined elapsed time criteria value.

6. The system of claim 1, wherein the processor is further programmed to enable the first location sensor.

7. The system of claim 1, further comprising means for energy-efficient location determination on the mobile computing device using two location sensors.

8. The system of claim 1, further comprising means for energy-efficient location determination on the mobile computing device by using community-based location information cost values.

9. One or more computer storage media storing computer-executable components, said components comprising:
   a first sensor component that when executed by at least one processor causes the at least one processor to obtain first location information from a first location sensor associated with a computing device during a session;
   a memory component that when executed by at least one processor causes the at least one processor to access a location information cost value associated with the first location information obtained by the first sensor component;
   a threshold component that when executed by at least one processor causes the at least one processor to compare the location information cost value accessed by the memory component with a predefined cost criteria value; and
   a second sensor component that when executed by at least one processor causes the at least one processor to obtain second location information from a second location sensor associated with the computing device if the location information cost value accessed by the memory component satisfies the predefined cost criteria value, otherwise closing the session without enabling the second location sensor.

10. The computer storage media of claim 9, wherein the second sensor component further calculates an updated location information cost value based on the second location information obtained by the second sensor component.

11. The computer storage media of claim 9, wherein if the location information cost value accessed by the memory component satisfies the predefined cost criteria value, the second sensor component further:
   enables the second location sensor associated with the computing device;
   measures one or more signal quality values of the enabled second location sensor;
   compares the measured signal quality values with one or more corresponding predefined signal criteria values;
   obtains the second location information via the second location sensor if the measured signal quality values satisfy the predefined signal criteria values; and
   otherwise disables the second location sensor without obtaining the second location information.

12. The computer storage media of claim 9, further comprising enabling the first sensor, and wherein enabling first location sensor consumes less energy than enabling the second location sensor.

13. The computer storage media of claim 9, wherein the location information cost value comprises one or more of the following: an energy-per-fix value and a financial cost value.

14. The computer storage media of claim 9, wherein the first location sensor comprises a radio and the second location sensor comprises a global positioning system receiver.

* * * * *